United States Patent
Bao et al.

(10) Patent No.: US 7,260,087 B2
(45) Date of Patent: Aug. 21, 2007

(54) IMPLEMENTATION METHODOLOGY FOR CLIENT INITIATED PARAMETER NEGOTIATION FOR PTT/VOIP TYPE SERVICES

(75) Inventors: Derek Hongwei Bao, Concord, CA (US); Vikram Rawat, Concord, CA (US)

(73) Assignee: Cellco Partnership, Bedminster, NJ (US)

( * ) Notice: Subject to any disclaimer, the term of this patent is extended or adjusted under 35 U.S.C. 154(b) by 981 days.

(21) Appl. No.: 10/404,068

(22) Filed: Apr. 2, 2003

(65) Prior Publication Data

US 2004/0196826 A1    Oct. 7, 2004

(51) Int. Cl.
*H04L 12/66* (2006.01)

(52) U.S. Cl. ............... 370/352; 370/354; 455/432.2; 455/552.1

(58) Field of Classification Search ........ 370/352–358; 709/227–228, 230; 455/424, 426.1, 432.2, 455/432.3, 435.2, 552.1
See application file for complete search history.

(56) References Cited

U.S. PATENT DOCUMENTS

| | | | |
|---|---|---|---|
| 6,360,093 B1 | 3/2002 | Ross et al. | |
| 6,493,328 B2 | 12/2002 | Fong et al. | |
| 6,934,756 B2 * | 8/2005 | Maes | 709/227 |
| 2002/0068565 A1 | 6/2002 | Purnadi et al. | |
| 2002/0186696 A1 | 12/2002 | Lim | |
| 2002/0196749 A1 | 12/2002 | Eyuboglu et al. | |
| 2003/0032439 A1 | 2/2003 | Harris et al. | |
| 2003/0086414 A1 * | 5/2003 | Hoffmann | 370/352 |
| 2004/0100993 A1 * | 5/2004 | Bouwen | 370/493 |
| 2006/0041431 A1 * | 2/2006 | Maes | 704/270.1 |

* cited by examiner

*Primary Examiner*—Binh K. Tieu
(74) *Attorney, Agent, or Firm*—McDermott Will & Emery LLP

(57) ABSTRACT

Voice over data-packet protocol, for example voice over Internet Protocol (VoIP), type communications in a network providing wireless packet data service are optimized by implementation of a mobile station initiated negotiation of radio protocol parameters adapted specifically to support the voice over data-packet application. Call set-up signaling for such a call utilizes a set of parameters for radio communication defined for a normal packet data service, for example, with packet retransmission between the base station and the mobile station. The mobile station recognizes the VoIP communication. When VoIP call set-up signaling over the robust link is complete, the mobile station sends a request to the radio network to modify one or more of the radio parameters, for example, to turn-OFF the packet retransmission; to facilitate the actual communication of VoIP packets.

32 Claims, 5 Drawing Sheets

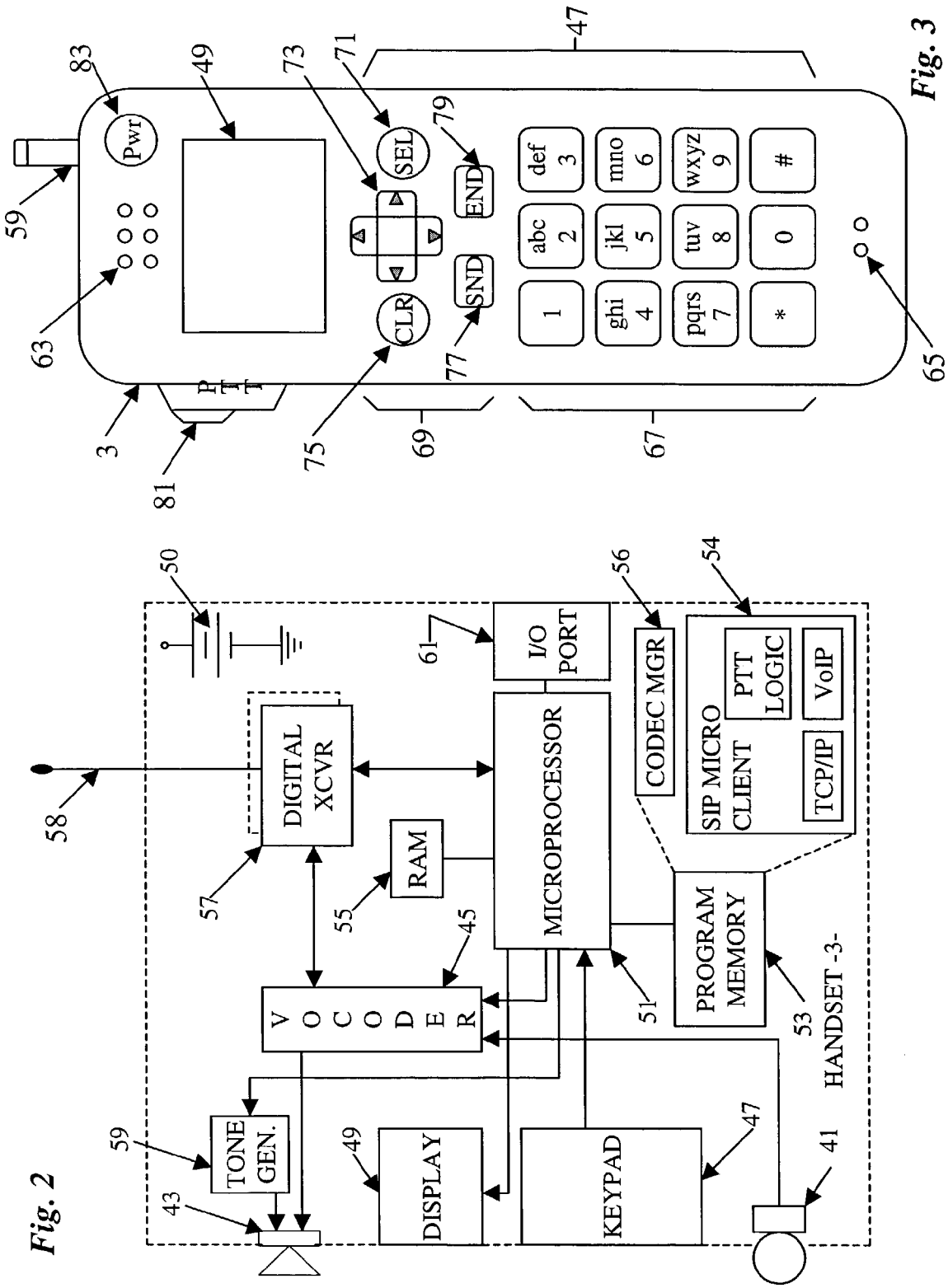

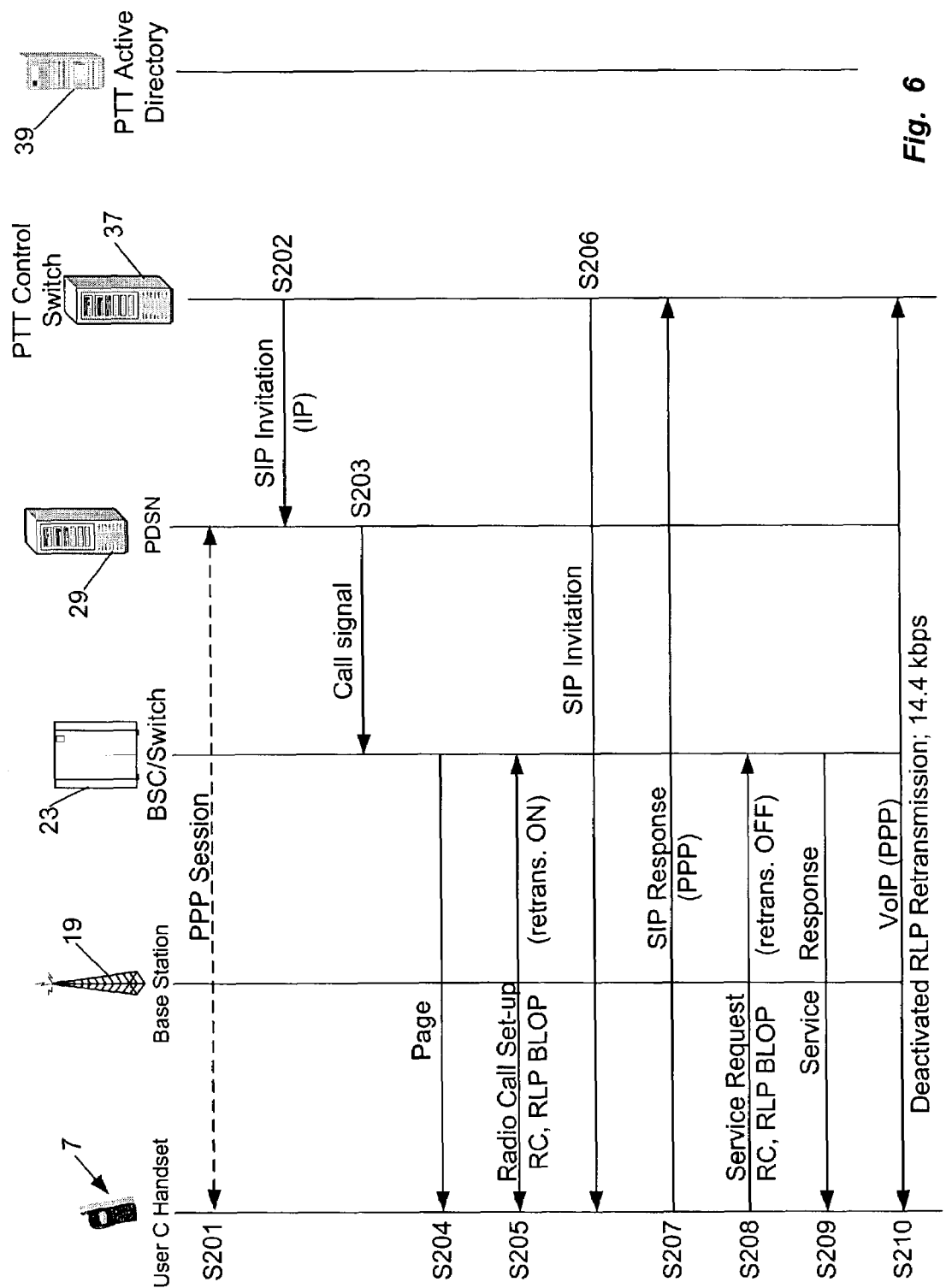

IMPLEMENTATION METHODOLOGY FOR CLIENT INITIATED PARAMETER NEGOTIATION FOR PTT/VOIP TYPE SERVICES

TECHNICAL FIELD

The present subject matter relates to techniques and equipment to allow a mobile station to negotiate data communication parameters, after an initial session set-up, for example, to support Push to Talk (PTT) or other voice over data-packet type services via the mobile data session.

BACKGROUND

In recent years, cellular or personal communication service type mobile telephones have emerged as a must-have appliance among mobile professionals and consumers alike, growing in popularity every year since they were first introduced. The public has come to accept that mobile service enhances business and personal communications and may contribute to personal security. Consequently, mobile communication is becoming increasingly popular, particularly for voice-grade telephone services, and more recently for data communication services.

The cellular wireless networks originally were designed to service circuit-switched voice communications. More recently, many mobile service providers have been upgrading the wireless networks to support packet-switched data communications services, which are intended to extend the common data communication capabilities of the wired domain to the wireless mobile domain. For such services, a node of the radio access network (RAN) provides an interface between the transmission of the packet data over the air interface of the radio network and the transmission of the packet data in the fixed network.

A packet-switched network routes each packet individually through the network, though not necessarily through a common path; as opposed to the traditional circuit switched approach to telephone service and the like that provides a path through the network for the duration of the communication session. Packet switching uses a standard packet protocol, such as the Internet Protocol (IP). The routing decision regarding each packet's next hop through the packet switched network is made on a hop-by-hop basis (typically between neighboring switching nodes). A circuit switched link provides constant sequential throughput with minimal delay caused by the network. In contrast, because they take different paths, different packets take different times to transit the network and may even arrive out of sequence.

The wireless data services, for example, support a range of communication applications utilizing two-way packet-switched packetized data, such as browsing, instant messaging, e-mail and the like. Wireless network operations for data calls are tailored to support traditional IP packet-based service applications. For example, the Radio Link Protocol (RLP) parameter set developed for packet services includes a retransmission feature. In an RLP network, if a packet radio device (mobile station or base station) erroneously receives a data packet, the receiving device sends back a negative acknowledgement (NAK), which includes an identifier of the erroneously received data packet. The sending station stores transmitted data packets in memory, e.g. until successfully acknowledged. Hence, in response to the NAK, the transmitting device will retransmit the identified (erroneously received) data packet to the other device. The retransmission insures that all packets of a communication are successfully received, because the common data communication applications are vulnerable to errors in received data and to dropped/lost packets. However, the need to retransmit increases the overall delay in communicating the effected packets.

In recent years, as the speeds of packet-switched communications equipment and the speed of processors have increased, a variety of applications have emerged that utilize IP packet transport as an alternative bearer for voice communications. Such applications are often referred to as "Voice over IP" or "VoIP" services. Although originally developed for wireline network transport through the Internet and through wireline intranets, VoIP services are now migrating onto the packet transport networks deployed for the wireless domain. For example, it is now being proposed to use packet communications and VoIP to provide a push-to-talk (PTT) wireless broadcast communication service (see e.g. U.S. Pat. No. 6,360,093 to Ross et al.).

A conventional push-to-talk (PTT) communication utilizes several radio transceiver stations, all tuned to the same channel. When not transmitting, the transceivers receive any signal carried over the channel and supply any received audio to the users. A user wishing to speak pushes a button, which causes that user's transceiver to transmit audio over the common channel to the other transceiver(s) that share the channel. A Voice over IP (VoIP) implementation of a PTT service application utilizes separate packet links for the user devices and a dispatch application on a server. The sender station uses its link through the wireless packet data service to upload the sender's audio information to a PTT server. Each station of one of the other member or members of the PTT group obtains the data from the server via its packet service link; and each receiving station converts the data back to digitized voice. The other stations on the PTT session may be similar mobile stations or data devices of various other types communicating with the server via the wireline packet data network.

VoIP service applications like PTT, however, present a different set of demands on the radio network than do traditional packet data service applications. Like normal voice telephone services, most VoIP services are more sensitive to latency and delay issues than are regular data applications. The end user is listening and/or speaking in real-time; and undue delays disrupt conversational speech. Differences in delay between packets, if large, produce an audible jitter. Unlike, data services, however, human users of VoIP services usually can tolerate some degradation of quality due to bit errors or lost packets.

In view of these aspects of the VoIP service, certain features of the wireless parameters on the radio link that have been optimized for data services may actually be detrimental or at least unnecessary on a VoIP call. For example, although it insures fidelity, RLP retransmission may cause perceptible problems with conversational audio communications, particularly as it imposes increasing delays due to needs to retransmit increasing numbers of packets in the presence of increasing noise levels on the radio link. Also, the bit rate on the fundamental channel may be too low to support an adequate encoding rate for the speech signal, in view of the overhead added by the encapsulation of the audio data in IP packets.

Hence, it has been suggested that the operational parameters could be adjusted for VoIP communications. Traditional data service calls would utilize the robust communication control parameters, for example, with the RLP retransmission feature. VoIP calls would utilize a different set of control parameters, for example, without activation of the retransmission feature. However, because many wireless customers would utilize both types of services, it would be necessary to differentiate between voice and data applications, on individual packet calls, in order to correctly set the communication control parameters for each and every packet call through the wireless network.

Several of the equipment vendors have proposed development of a proprietary 'Service Option' (SO) approach. A service option is a standard level of service offered for a particular type of call through the radio access network. A normal packet data call, for e-mail or browsing, for example, utilizes Service Option 33 (SO33). By contrast, a normal voice-grade telephone call utilizes Service Option 3 (SO3).

Although the parameters settings are negotiable for each Service Option, the mobile station and the radio network typically utilize a set of normal or 'default' parameter values in associate with each service option. The mobile station requests an SO33 call and sets its operations in accord with normal parameters, and the base station controller assigns resources (if available) to the call supporting those parameters. For packet data calls using SO33, the default parameters are optimized for data applications transported in packet form. Hence, the network typically sets the parameters for packet data service under SO33 to include the RLP retransmission mechanism, to provide reliable transmission of data over the air interface and minimize costly retransmissions at the higher protocol layer. SO33 packet data calls also typically use a radio channel configuration of RC3 or RC4, which provides 9.6 kbps fundamental forward channel, rather than the 14.4 kbps fundamental forward channel typically provided for digital voice calls (under RC5). On the reverse link, RC3 provides 9.6 kbps, RC4 provides 14.4 kbps. Technically, the network and mobile station can use RC3, RC4 and RC5 for packet (SO33) or for voice (SO3) calls, although not all of these radio configurations are deployed and available on both forward and reverse radio links.

The vendors propose to provide a different Service Option and an associated set of typical/default parameters specifically tailored to the needs of PTT and other VoIP services. The new Service Option, for example, would not typically utilize the RLP retransmission mechanism, and it would typically provide a 14.4 kbps fundamental channel to allow use of a higher rate vocoding and thereby provide better voice quality. Implementation of multiple Service Options, however, would require a standards body process to develop and implement the new option and would require some mechanism to select between the available Service Options (and possibly to negotiate the parameters) on individual calls.

As currently proposed, packet calls would normally default to SO33 and the associated typical parameter set. On VoIP calls originating from a mobile station, the mobile station would signal the radio access network of the desired Service Option and associated new parameters for each VoIP packet call. The signaling message, for example, would notify the network that the mobile is attempting to make a VoIP/PTT call. In response, the base station controller (BSC) function in the network would control the network elements to turn OFF the RLP retransmission and to provide a 14.4 kbps channel for the call.

Such an approach would involve an explicit indication from the mobile station that a call is a push to talk or other type of VoIP call. Since the standards bodies have not defined the new Service Option or the attendant signaling, each equipment vendor would offer a different proprietary implementation. This would require new handsets with the requisite signaling capability, and each vendor's network equipment and mobile stations would be different and incompatible with those of other vendors.

On incoming packet calls, directed to a mobile station with both normal data service and VoIP service, the terminating mobiles are not aware of the nature of the call when they send the Page Response. In the current proposals, to set the Service Option, the network would need to detect VoIP packets and set the radio protocol parameters to those for the corresponding VoIP Service Option. To do this, some node of the network, such as the packet control function (PCF) or the base station controller (BSC), would need to examine incoming TCP packets during initial set-up of packet calls, to determine whether or not they relate to a VoIP service. Upon detecting an incoming VoIP call directed to a mobile station, the PCF or BSC would control the radio access network (RAN) to set the VoIP Service Option and parameters. Packet sniffing is complex, costly and time consuming.

The Service Option approach would require establishment of a standard definition the new Service Option. As shown by the above discussion, this approach also requires proprietary signaling from the mobile stations to the network on outgoing calls and attendant processing capability in the radio access network. Furthermore, this approach would not be supported by the existing handsets. This approach also requires the network to sniff the packets for all terminating calls, before the call setup, in order to determine if the calls are VoIP calls. This is a very complex implementation. Also, some or all of the signaling of the VoIP call set-up would occur after the shift to the new Service Option and the associated change in parameters, for example, without the integrity assurance provided by packet retransmission.

Another approach might be to apply one set of parameters for all packet data calls, including PTT or VoIP calls. However, if the parameters are tailored to PTT or VoIP calls (e.g. without retransmission), this would have a negative impact on PTT/VoIP packet data calls, as the initial call setup would be done over an unreliable radio link without RLP retransmission. Furthermore, this would compromise the set-up and quality for all non-PTT/VoIP packet data calls, as those calls require a different set of parameters, such as RLP retransmission.

Hence a need exists for a more effective technique to readily adjust radio network operation parameters for the air link in order to meet different operational demands of the different types of packet service applications, for example, for VoIP calls as opposed to traditional packet data applications, which overcomes any or all of the deficiencies outlined above.

SUMMARY

The concepts disclosed herein alleviate the above noted problems with transport of voice over data-packet communications (e.g. VoIP) through a wireless network, by using a packet session initially set-up in accord with first parameters and establishing new parameters for voice over data-packet communications, when the mobile station recognizes that the session will relate to such a packet-voice application.

For example, a method of packet call set-up in a radio access network would involve establishing a packet communication session through the radio access network with a mobile station, using first radio protocol parameters. When a voice over data-packet call begins, the network transports signaling for the voice over data-packet call to or from the mobile station, via the established packet communications session. This signaling communication uses the first radio protocol parameters. The mobile station determines that the call relates to a voice over data-packet application. Hence, in this example, the network receives a request for modification of one or more of the radio protocol parameters to support the voice over data-packet call, from the mobile station. In response, the network sets second radio link protocol parameters for the established packet communication session. In the second set of radio protocol parameters, at least one parameter is modified from its respective setting in the first set of parameters, so as to adapt the radio communication to support the voice over data-packet call.

In the disclosed examples, the setting of the second parameters may entail turning off the RLP retransmission feature. As another example, this setting operation may involve reconfiguration of the radio channel to provide a different bit rate, e.g. from 9.6 kbps for the typical packet data communication service to 14.4 kbps for voice over data-packet applications.

Once the new parameters are set, with one or more parameters adapted for voice over data-packet applications, the network transports voice over data-packet communication signals for the call of the mobile station. All subsequent voice over data-packet communications via the established packet session use the second set of radio protocol parameters.

Because the mobile station detects the voice over data-packet application and signals to the network, this technique is readily adaptable to processing of both mobile station originated voice over data-packet calls (outgoing) and mobile station terminated voice over data-packet calls (incoming). Also, if the mobile station is otherwise capable of conducting voice over data-packet communications, the station is readily able to determine the use of a voice over data-packet application on any particular call. Furthermore, the service negotiation of the parameters can be implemented using standard radio network signaling protocols. Hence, the mobile station and the network elements need only be programmed to initiate and negotiate calls, as described. There is no proprietary hardware or software needed. In many cases, the network elements already have the necessary negotiation capability, and all that is needed is an upgrade of the handset client software to perform the negotiation at the appropriate points in the voice over data-packet calls.

As used herein, the phrase "voice over data-packet" refers to communications of digitized audio information (typically voice) utilizing a packet, cell or frame protocol designed for data applications; as distinct from normal digital telephone communications utilizing standardized packet, cell, or frame formats adapted and normally intended for voice or other audio communications for example in the normal telephone sense. The examples of "voice over data-packet" applications described herein are voice over Internet Protocol or "VoIP" type applications. However, the "voice over data-packet" terminology is intended to cover VoIP as well as other types of audio communications over other packet protocols adapted for packet-switched data communications.

Aspects of invention, embodying the concepts, may be implemented in radio access networks or nodes thereof or may be implemented in whole or in part in the mobile stations. Aspects of invention also encompass hardware and software, for use in the mobile stations and/or the network nodes, for implementing the voice over data-packet call set-up procedures.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a functional block diagram of a radio access network providing telephone service, packet data service and voice over IP type packet service for a push-to-talk application or the like.

FIG. 2 is a functional block diagram of a mobile station that may operate in the network of FIG. 1.

FIG. 3 is an exemplary front plan view of a mobile station, such as the station shown in functional diagram form in FIG. 2.

FIG. 6 is a signal flow diagram for call set-up of a push-to-talk session terminating at (directed or incoming to) a mobile station.

DETAILED DESCRIPTION

The various examples disclosed herein relate to call or session set-up through a radio access network, with establishment of radio packet communication parameters to adapt the session to a particular application. Typically, traditional packet data communications use a defined Service Option as well as the corresponding default parameters. In the examples, the initial set-up of any packet session will utilize that Service Option and the default parameters associated therewith. The network and the mobile station will initially treat the call like any other packet-switched data communication.

However, the mobile station will detect a voice over data-packet application, for example, if the user is initiating a push-to-talk session or is receiving a VoIP call. The mobile station will signal the radio access network regarding parameters for the voice over data-packet application, although the mobile station need not identify the application or an alternative Service Option. A new set of radio link parameters are set-up for the voice over data-packet communications, for example using one or more parameters modified and thereby optimized for PTT or other VoIP application. Before such renegotiation, however, application layer call set-up signaling for the voice over data-packet communication actually uses the radio protocol parameters normally associated with the packet data Service Option, e.g. with RLP retransmission of packets to avoid loss of signaling data. Then after renegotiation, the voice over data-packet communications for the mobile station, e.g. for the VoIP application, utilize the optimized second set of parameters, e.g. without retransmission.

Figure 1:
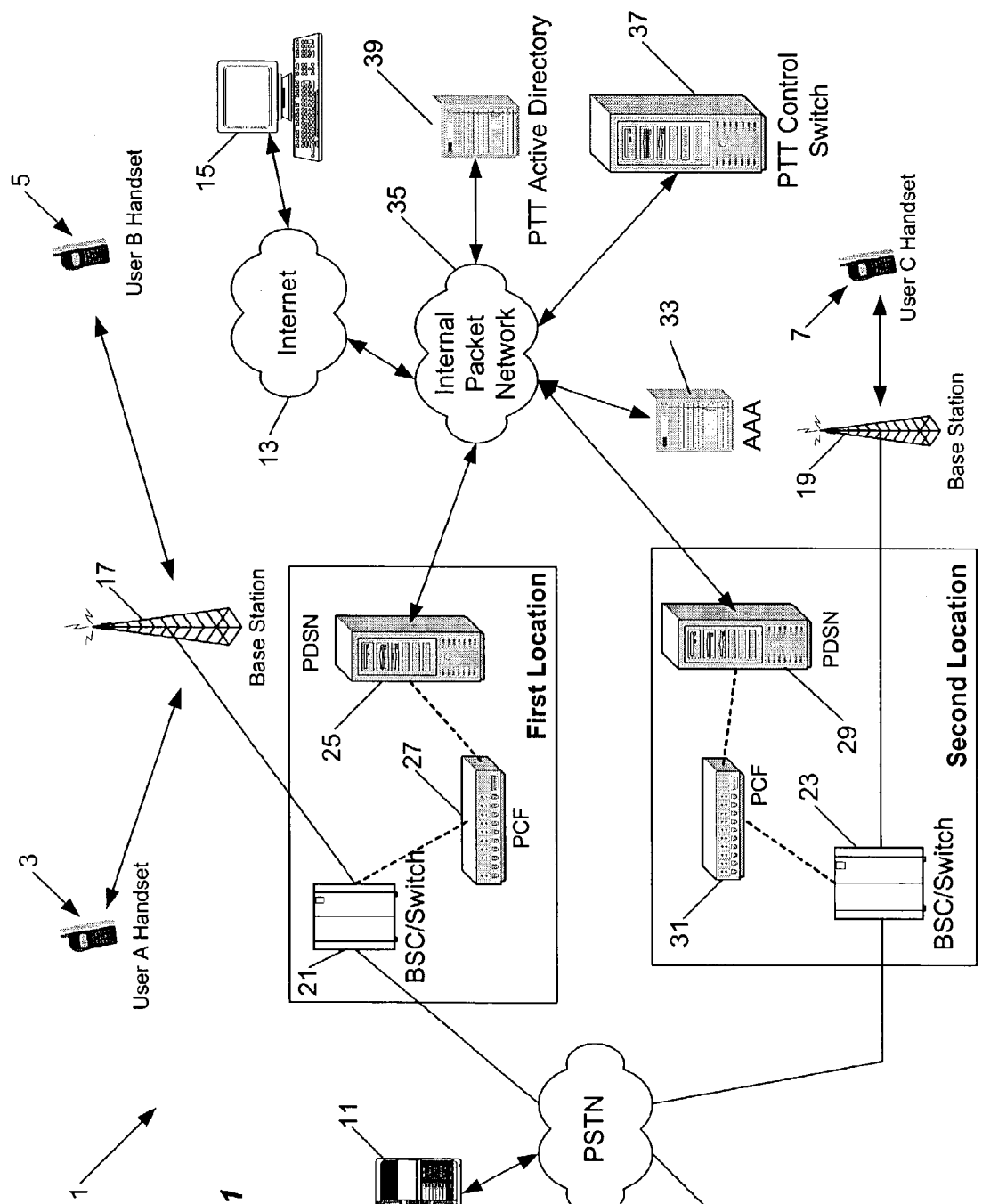

Reference now is made in detail to the presently preferred embodiments, which are illustrated in the accompanying drawings and discussed below. For purposes of further discussion, the examples will focus on VoIP examples of voice over data-packet communications. FIG. 1 illustrates the functional elements of a wireless communication network that supports mobile packet data communications and preferably supports mobile voice communications.

The inventive concepts are applicable to a variety of different wireless networks supporting packet data communications services, such as GSM/GPRS, UMTS, etc., as may be implemented in a variety of different frequency bands. A logical evolution of IS-95A type digital wireless communications toward a 3G (third generation) implementation involves an upgrade of the digital technology toward cdma2000-1X or 1X for short. The attendant Radio Transmission Technology (1xRTT) may use a 1.25 MHz CDMA bandwidth. Although there are many benefits associated with such 1X systems, the two most significant benefits are voice capacity increase and high-speed packet data. A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. Hence, the examples provide the inventive parameter negotiation for VoIP type services in the context of a 1xRTT type network 1. Although the elements of the network 1 are generally known, to insure a full understanding of the examples, it may be helpful to consider the general structure and operation of the network 1, before going into detail with regard to the inventive operations in that exemplary network.

The communication network 1 provides mobile voice telephone communications as well as packet data services, for numerous mobile stations. For purposes of later discussion, three mobile stations 3, 5 and 7 appear in the drawing; each operated by a different user. The network 1 enables users of the mobile stations to initiate and receive telephone calls to each other as well as through the public switched telephone network (PSTN) 9 to landline telephone devices 11. The network 1 also enables users of the mobile stations to initiate and receive various data communications, for example to or from the public data network referred to as the Internet 13 to send or receive data from other digital devices represented by the exemplary personal computer 15. The network 1 provides the various wireless communication services in accord with a digital radio protocol, although for voice telephone services, the network may also support the legacy analog protocol as well.

The mobile stations 3, 5 and 7 may take many forms. For example, some mobile stations may be enhanced mobile telephone stations with display and user input capabilities to support certain text and image communications, for example, for e-mail and web browsing applications. Other mobile stations may comprise portable digital assistants (PDAs) with built-in wireless communication capabilities. As another alternative, a wireless device such as a mobile telephone having data communication capabilities may be connected to a portable computing device such as a handheld or laptop type computer.

Physical elements of one radio access network (RAN) include a number of base stations, represented by the examples at 17 and 19, which communicate over the air-link with the mobile stations 3, 5 and 7. A base station typically includes a base transceiver system (BTS) coupled to antennae mounted on a radio tower within a coverage area often referred to as a "cell." The base station or base transceiver system (BTS) is the part of the radio network that sends and receives RF signals to/from the mobile stations that the base station 17 or 19 currently serves. The network 1 also includes a number of radio access network switches. The drawing shows two of the switches 21 and 23. The switches 21, 23 are modern versions of mobile switching centers (MSCs), which support both cellular voice and packet data services. Each switch 21 or 23 connects through trunk circuits to a number of the base stations, which the respective switch controls.

The base station 17 or 19 assigns and reassigns channels to the mobile stations and monitors the signal levels to recommend hand-offs to other base stations. The network 1 typically includes a base station controller (BSC) functionality that controls the functions of a number of base stations and helps to manage how calls made by each mobile station are transferred (or "handed-off") from one serving base station to another. Each wireless network equipment vender implements this function differently. Some vendors have a physical entity, which they call a BSC, while other vendors include this functionality as part of their switch 21 or 23, as shown in the example of FIG. 1.

In a 1xRTT network of the type generally shown in FIG. 1, the radio control functions of the BSC are enhanced to provide added control adapted specifically to support packet data communications over the wireless air-link interface for communications through the base station(s) 17 or 19 controlled by the particular BSC/switch 21 or 23. For example, a BSC functionality will receive a packet data service profile of each mobile station it services, and the BSC will use that profile to control certain handoff operations as well as to interact with the packet routing functionality provided through the associated PDSN 25 or 29.

The network 1 also includes a number Packet Data Serving Nodes or "PDSNs." In the illustrated example, a PSDN 25 connects to the first switch 21 via a component 27 providing a packet control function (PCF). In a similar fashion, a PSDN 29 connects to the second switch 23 via a PCF component 31. The PDSN is a fixed network element introduced in the architecture for 3g networks, to support packet-switched data services. The interface between a cdma2000-1X radio access network 1 and the PDSN 25 and 29 is called the R-P Interface. Each PDSN 25 or 29 establishes, maintains and terminates logical links to the associated portion of the radio access network 1, across the R-P interface. The PDSNs also support point to point (PPP) sessions with the mobile stations. The PSDNs provide the packet routing function from the radio access network to/from other packet-switched networks, represented by private network 35 and the Internet 13, in the drawing.

The PDSN 25 or 29 initiates Authentication, Authorization and Accounting (AAA) communications to an AAA server 33, for example, via an internal packet network 35, for each mobile station client seeking packet communications. The server 33 provides Authentication, Authorization, and Accounting (AAA) functions for packet data calls in a cdma2000-1X network, such as the network 1. Such servers authorize service subscriptions, service profiles, and customized services. The AAA server 33 also performs a variety of accounting functions, including starting an accounting record, maintaining an interim accounting record, and stopping an accounting record, for each packet data communication service session. The PDSN 25 or 29 receives service parameters for the mobile station, now operating as a mobile client, from the AAA server 33. The PDSN also collects usage data for accounting purposes, which it relays to the AAA server 33. The PDSN also is the network element that actually routes packets to/from external packet-switched data networks, for example through the internal network 35 to and from the Internet 13.

The illustrated network 1 also includes nodes 27, 31 providing the Packet Control Function (PCF). Although some implementations use the PCF to take over packet service related functions of the BSC, in the example, the PCF function converts the radio protocols into packet protocols to allow the associated PDSN to route packets in standard packet protocols via the networks 35 and 13. Hence, in the example, one office location includes a PCF processor 27 between the switch 21 and the PDSN 25; and the other exemplary office location includes a PCF processor 31 between the switch 23 and the PDSN 29. The PCF 27 relays packets and provides the necessary protocol conversions between radio communications via base stations 17 and the PDSN 25. Similarly, the PCF 31 relays packets and provides the necessary protocol conversions between radio communications via base stations 19 and the PDSN 29. The PCF 27 or 31 may provide buffering of packets, if available resources allocated to a mobile station are temporarily overloaded by a packet flow.

Although shown separately, the PCF function may be incorporated in the switch or other node that performs the BSC function, or the PCF function may be incorporated into the PDSN. In the example shown, each PCF 27 or 31 is a stand-alone packet switching node.

The illustrated network 1, in addition to normal cellular type telephone services, supports a range of packet data services. The packet data communications can support traditional data applications, such as browsing the Internet 13 and e-mail communications to/from remote computers such as personal computer 15. For purposes of the present discussion, however, the packet data communications through the network 1 can support Voice over IP (VoIP) type packet applications. VoIP communications entail digitizing and compressing audio information (typically audible speech information), and dividing the resultant data stream into portions that are encapsulated into IP packets, using an appropriate higher level protocol such as transmission control protocol (TCP). Packet switching nodes, such as the PDSN 25 or 29 and the packet switches of the networks 35 and 13, route the packets to the addressed destination. A computer or other processing device at the destination reconstructs the digital stream from the packets, decompresses the data and converts the results back to an audible output signal for presentation to the recipient end user.

The VoIP applications, for example, may provide communications between a handset 3 and a landline computer 15 via the Internet 13. One VoIP application of particular note in the commercial wireless industry provides a 'push-to-talk' type service for mobile handset users. To fully understand this service application and it implications in the context of the network 1, it may be helpful first to review briefly the basic concept of a push-to-talk service.

As noted briefly above, a conventional push-to-talk (PTT) communication utilizes several radio transceiver stations, all tuned to the same channel. When not transmitting, each transceiver is in a receive only mode, in which it receives transmissions over the channel (if any) and supplies the received audio to the user. Any user who wishes to speak pushes a button on his or her transceiver, causing that user's transceiver to transmit audio over the common channel. Releasing the button causes the transceiver to return to the receive mode. Any number of users may share the same channel.

A voice over IP (VoIP) implementation of a PTT service application utilizes wireless packet data service in combination with a wireline data network, such as the Internet or an intranet or extranet. Each member of the group has a packet-switched session linking the member to a dispatch server. The server effectively distributes packets received from the member who has the floor (is speaking) to the other members. For example, if the station 3 is transmitting, the other stations on the PTT session may be similar mobile stations 5 and 7 or data devices of various other types communicating with the server via the wireline data network 13 or 35, such as the computer 15. In the illustrated example, the packet data communications for the mobile stations extend through the PDSN 25 or 29 and the carrier's internal packet network (private intranet) 25.

With the mobile PTT service, a mobile station 3, 5 or 7 is designated as the broadcaster, in response to the push-to-talk signal. This signal may be generated by actuation of an actual push-to-talk button on the particular mobile station, but often the signal is a logical control function, for example, generated in response to speech detection. The broadcasting mobile station digitizes the voice of the user, packetizes the digitized audio, and sends IP packets containing the audio to a base station 17 or 19 of the radio access network. The base station sends the data through the PDSN 25 or 29 and the data network 35, for loading thereof onto a PTT server, represented by the PTT control 'switch' server 37 in FIG. 1. The PTT control switch 37 replicates packets and adds destination addresses, as necessary, to send the VoIP packets to the other stations 5 and 7 (and/or to wireline connected terminal device 15) that are currently participating in the particular PTT session. The stations of the other group members receive and process packets from the PTT control switch 37 and convert the data back to digitized voice.

The PTT control switch 37 also dynamically controls which participant station "has the floor" to broadcast, and thus which station or stations will receive broadcasts at any given time. The server 37 can dynamically designate any participating station as the broadcaster, and can dynamically configure any set of stations as the receivers of the PTT broadcast.

For purposes of initially establishing a PTT session, the service provider may also operate a PTT Active Directory server 39. The server 39 maintains a database of established groups for PTT communication, much like the buddy lists for instant messaging. When members' stations come on-line, the stations register as active with the PTT Active Directory server 39. For the active stations, the server 39 also maintains dynamic information regarding each station's current location, e.g. including current network address information. When a user operates a station 3 to set-up a PTT communication session, the station signals the PTT control switch 37, and the switch 37 accesses the PTT Active Directory server 39 to determine if the other desired participant station or stations (e.g. 5 and 7) are on-line, and if so, to obtain the information needed to contact each of the one or more other stations. The PTT control switch 37 uses the information from the directory server 39 to invite the other stations 5 and 7 to participate in the PTT session.

The network 1 utilizes radio protocol parameters to define the operational characteristics on the radio communication links between the base stations 17, 19 and the mobile stations 3, 5, 7. Different types of networks may define different parameters and/or utilize different protocols for signaling regarding such parameters. The exemplary 1xRTT network shown in the drawings utilizes the Radio Link Protocol (RLP) and Radio Configuration (RC) type parameters for such purposes. For example, the RLP layer provides a retransmission feature. The RC is a lower layer parameter, and the different Radio Configurations (such as RC3, RC4 and RC5) provide different digital bit rates supported on the fundamental channel. RLP and RC are just two examples of different aspects (at different layers) of radio protocol parameters.

The network offers predefined Service Options for different types of calls, e.g. voice-grade telephone calls and packet-switched data communications. The Service Options typically have associated sets of radio protocol parameters, which may be specified as the default parameters for the Service Option, to support each specific service application (voice and packet-switched data, in our example). In a common network arrangement, one such Service Option is Service Option 33 (SO33), for packet-switched data communication services; and another such Service Option is Service Option 3 (SO3) for voice-grade telephone calls. Of note for purposes of this discussion, the mobile stations and network typically negotiate a default parameter set for SO33 calls that includes an active packet RLP retransmission feature and includes one of the radio configurations that provides a 9.6 kbps rate on the fundamental channel (e.g. in the forward direction).

In accord with the present concepts, the initial VoIP call setup, that is to say the PTT call set-up in our example, is done over a reliable radio link, for example, using the noted default parameters for packet-switched data communications. From the perspective of the station initiating the PTT call, this includes signaling to/from the PTT control switch 37. From the perspective of either of the other participant stations 5 and 7, this includes receiving the network page that a packet communication is directed to the station, as well as the invitation to participate and any other signaling with the PTT control switch 37 to set-up the PTT application. In our example, these signaling communications utilize the parameter set with the active RLP packet retransmission feature and with the radio configuration that provides a 9.6 kbps rate on the fundamental channel.

Once the call setup is complete, each mobile station is aware that the packet communication relates to a VoIP service, such as the PTT application. It is not necessary for the network to recognize VoIP. Instead, the client program in each mobile station causes that station to initiate a new parameter negotiation. The mobile station transmits a Service Request, specifying one or more parameters to be modified, in this case to specifically support VoIP communications. The network 1 routes this request message to the node 21 or 23 providing the BSC function in the respective serving location. Assuming that the network can provide the resources to correspond to the modified radio protocol parameter(s), the BSC responds with a Service Response granting the request and controls the appropriate base station 17 or 19 to operate in accord with the modified set of parameters. Further communication to or from the respective station then utilizes the second parameter set, with one or more of the individual parameters specifically adapted to support VoIP, e.g. without retransmission and/or with a reconfigured fundamental channel providing a higher bit rate. This approach helps the wireless carrier or other service provider to deploy PTT and other VoIP type services, without requiring changes to the standards or use of proprietary service options.

It is assumed that those skilled in the art are familiar with the various stations, computers, servers, packet networks and radio network nodes described above with regard to FIG. 1. However, since the mobile station determines when VoIP requires a parameter negotiation and conducts the necessary negotiations, it may be helpful to review the general structure and operation of an example of a mobile station. For purposes of discussion, it will be assumed that the station is the unit 3 in FIG. 1, although typically, the other stations 5 and 7 will have similar structures and operate in a similar manner.

FIG. 2 is a functional block diagram, and FIG. 3 is in a plan view, illustrating a telephone implementation of the mobile station 3. Although the station may be incorporated into a vehicle mounted mobile unit or into another device, such as a portable personal computer or PDA, for discussion purposes the illustrations show the station 3 in the form of a handset.

The handset embodiment of the mobile station 3 functions as a normal digital wireless telephone station. For that function, the station 3 includes a microphone 41 for audio signal input and a speaker 43 for audio signal output. The microphone 41 and speaker 43 connect to voice coding and decoding circuitry (vocoder) 45. For a normal voice telephone call, for example, the vocoder 45 provides two-way conversion between analog audio signals representing speech or-other audio and digital samples at a compressed bit rate compatible with the digital protocol of the wireless telephone network communications. The vocoder may implement different compression/decompression schemes, so as to send and receive digital audio information streams at rates selected in response to a control signal from the microprocessor control unit 51. This same vocoder 45 may be used to digitize outgoing audio signals and convert a received digital audio stream to analog, for VoIP communications, as will be discussed later.

For digital wireless communications, the handset 3 also includes a digital transceiver (XCVR) 57. The concepts discussed here encompass embodiments of the station 3 utilizing any digital transceiver that conforms to current or future developed digital wireless communication standards. For example, the transceiver 57 could be a TDMA or GSM unit, designed for cellular or PCS operation. In the present embodiments, the digital transceiver 57 is a CDMA transceiver, of the type used in 1xRTT networks. The transceiver 57 provides two-way wireless communication of information, such as vocoded speech samples and packetized digital message information. The transceiver also sends and receives a variety of signaling messages in support of the various services provided via the station 3 and the network 1. The transceiver 57 connects through RF send and receive amplifiers (not separately shown) to an antenna 58. The operational parameters of the transceiver 57 may be set, for example to utilize a specified logical channel and/or a specified radio channel configuration, in response to one or more control signals from the microprocessor 51. The station 3 may include one or more additional transceivers, as shown in dotted line form, for operation in an analog mode or in accord with an alternative digital standard.

As shown, the digital telephone handset 3 includes a display 49 for displaying messages, a menu generated by a client browser program, call related information, dialed and calling party numbers, etc. A keypad 47 enables dialing digits for voice and/or data calls and generating selection inputs keyed by the user based on the displayed menu.

The microprocessor 51 controls all operations of the handset 3. The microprocessor 51 is a programmable device.

The mobile station 3 also includes memory 53, for example a flash type read only memory (ROM), for storing various software programs and mobile configuration settings, such as mobile identification number (MIN), etc. A non-volatile random access memory (RAM) 55 serves as a working memory during execution of programs. The memories also store data, such as telephone numbers and other data input by the user via the keypad 47 as well as received data (e.g. messages) for display.

In a present implementation, the program memory 53 stores an operating system, device driver software, call processing software, and the like. Of note for purposes of the consideration of packet communications, the memory 53 also stores client browser software 54 and vocoder manager software 56. In this example, the client software is an application level program in the form of a micro-client specifically adapted for SIP (session initiation protocol) type VoIP for call processing. The SIP micro-client program 54, for example, provides TCP/IP packet assembly and disassembly and signaling to set-up VoIP calls. The client 54 may also provide the application programming to implement the PTT service.

The vocoder manager software 56 provides the executable code for the microprocessor 51 to enable control over operations of the vocoder 45. For example, during normal cellular telephone operations, the microprocessor 51 operates the vocoder 45 to digitize and compress outgoing audio and to decompress and reconvert to analog, in the format compatible with the network standard for transmission and reception via the transceiver 57 and the standard cellular air link interface. However, for VoIP functions, the microprocessor 51 controls the vocoder to operate in accord with the applicable VoIP protocol. For outgoing audio, the digitized signals go to the microprocessor for TCP/IP encapsulation and the resulting packets are sent to the transceiver 57 for wireless packet transmission. The transceiver 57 supplies incoming packets to the microprocessor 51 to strip the packet header/trailer bits, and the microprocessor 51 supplies the digitized audio stream to the vocoder 45 for processing.

The mobile station 3 also includes one or more elements for providing perceptible alert signals to the user. In the illustrated example (FIG. 3), the station 3 includes a tone generator 59 coupled to the speaker 43. The microprocessor 51 provides instructions to the generator 59 to generate various output tones through the speaker 43, upon occurrence of various conditions, such as a user selected ring tone in response to an incoming call or message. The station 3 will similarly output various tones in response to control signals from the PTT control switch 37 to indicate status of the PTT communication, for example, a beep tone to indicate that the 'floor is open' for a new broadcaster to send, or a bong tone if the station 3 attempts to broadcast after the PTT control switch 37 has designated another station 5 or 7 as the PTT broadcaster.

A cellular telephone implementation of the mobile station 3 may also include an input/output (I/O) port 62 coupled to the microprocessor 51. The I/O port 61 enables two-way exchange of data between the mobile station 3 and an external device, such as a portable computer, for example to allow the mobile station 3 to act as modem or the like for data communication services for the portable computer through the network 3.

FIG. 3 shows the front of the cellular mobile station 3, in the form of a portable handset. As shown, the handset housing includes openings 63 enabling sound to emerge from the speaker 43, as well as openings 65 to allow input of sound to the microphone 41.

The handset 3 includes the visible display screen 39. The handset 3 also includes various keys making up the keypad 47. The keypad 47 typically includes at least two sets of keys 67, 69. The keys 67 represent dialing-input keys. Typically, each of the twelve keys 67 is imprinted with a number from 1 to 0, an asterisk or star (*) or a number sign (#). Each of the keys 67 numbered 2 through 9 also is imprinted with three or four letters, to enable input of alphabetical information.

The keys 69 are function keys. The exemplary set of function keys include a menu scrolling key 73, a selection (SEL) key 71, a clear (CLR) entry key 75, a send (SND) key 77 and an END key 79. The send (SND) key 77 is used to initiate or answer a wireless call, and the "END" key 79 is used to terminate a wireless call.

Although other keys with other functions and/or labels may be used in place of or in addition to those shown, FIG. 3 shows three function keys for input of information to and retrieval of information from the processor and memory of the handset and/or selection of features from a displayed menu. One of these keys is the two-way scrolling key 73, for controlling up and down movement of a displayed cursor or highlight function and attendant scrolling of menus shown on the display 49. The exemplary keys also include the selection (SEL) key 67, which enables a user to select an option indicated by the cursor or highlighting. The clear (CLR) key 69 enables the user to erase a selection. A wide variety of other cursor controls and selection inputs could be used. The user operates a power (Pwr) key 83 to toggle the handset 3 on and off.

The keypad 47 supplies user input information to the microprocessor 51, and the microprocessor provides digital data signals to cause the display to show appropriate information to the user. Under control of the microprocessor 51, the display 49 shows textual information, such as dialed numbers and name and number information regarding stored speed dialing lists. The display 49 also may have certain specialized indicators, such as a message-waiting indicator and various roaming or home service indicators. Hence, under control of the microprocessor 51 and its programming, the keypad 47 and the display 49 provide a user interface allowing the customer to input information and receive information.

The menu display and attendant control of cursor and selection via the various keys enables the user to select a number of telephone features and other applications offered by the mobile station 3. Of note, the menu will offer packet data communication options, such as web browsing and e-mail, as well as one or more VoIP communication options, in this case including a PTT application.

To make a routine telephone call, a user dials in the destination number by actuating the appropriate ones of the number keys 67 and then pushes the send (SND) key 77. As the user presses the number keys, the microprocessor 51 causes the screen 49 to display the dialed number. When it senses the actuation of the send (SND) key 77, the microprocessor 51 generates a call request message in the appropriate protocol. This message includes the dialed destination number. The microprocessor 51 causes the digital transceiver 57 to send the message, as a signaling message, for example over the signaling channel of the particular wireless air-interface to a base station, for call set-up processing by the network 1.

For incoming calls (or other incoming message communications), the digital transceiver 57 detects a paging message addressed to the particular mobile station on the paging channel, as received via the antenna 58. The digital transceiver 57 demodulates and decodes the paging message and forwards the message to the microprocessor 51 for further processing.

Upon receipt of the paging message, the microprocessor 51 determines the status of the mobile station 3, for example, to determine if it is otherwise engaged in an ongoing call or other ongoing communication session. If not engaged, then there is a need to alert the user. Depending on the user-selected mode of operation, the microprocessor 51 may instruct the tone generator 59 to output a selected tone through the speaker 43. In the network of FIG. 1, various types of page alert messages are received and indicated to the user for the different types of communications, including normal mobile telephone calls, incoming packet service communications, and incoming VoIP communications.

The user presses the send (SND) key 77 to answer the incoming call. In response, the microprocessor 51 terminates the alert signal(s) through the tone generator 59. The microprocessor 51 also initiates any necessary signaling through the digital transceiver 57 with the base station 17, to set-up the actual voice or packet link. For packet services, the microprocessor 51 also performs any higher level signaling necessary for the particular application, such as SIP signaling to the PTT control switch 37 to answer an SIP invitation and join a new PTT session.

Although many other mobile stations will be programmed to recognize other forms of PTT actuation by the user, for purposes of the PTT application, the special function keys 69 of the exemplary mobile station 3 may also include a physical PTT button 81. The micro-client 54 provides the logic for responding to operation of that button. During a PTT session, for example, the microprocessor 51 responds to depression of the PTT button 81 to signal the PTT control switch 37 that the station 3 is attempting to take the floor and broadcast. If the station is granted broadcast status, the microprocessor 51 causes the station to send digital audio in IP packets to the PTT control switch 37. When the user releases the PTT button 81, the microprocessor 51 causes the station 3 to signal the PTT control switch 37, and the microprocessor 51 changes station operation over to a receive mode. In the receive mode, the station 3 receives VoIP packetized audio and converts that to audible output signals for presentation to the user.

In the example, the PTT signal is generated by actuation of the push-to-talk button 81 on the particular mobile station 3. However, the signal may be a logical control signal generated by the microprocessor 51 in response to other conditions, for example, in response to actuation of a selected one of the other keys while the station is in the PTT mode or in response to detection of speech input by the user.

For purposes of the present discussion, it should be noted that the stored programming of the mobile station 3 also controls the negotiation of radio link parameters to support the different types of communications. For example, the programming controls set-up of a point to point protocol (PPP) link between a mobile station 3 and a PDSN 25 or 29 to enable packet communications. In a 1xRTT network 1, this will typically result in a configuration corresponding to Service Option 33 (SO33) and use of the associated default radio protocol parameter settings. The SIP micro-client programming 54 of the station 3 (or of any of the other stations 5 and 7) also enables the microprocessor 51 to determine that a packet communication relates to a VoIP application, such as the PTT service. The programming causes the station to conduct session set-up for the VoIP application over the existing radio link configuration, for example, using the radio protocol parameters initially set for a typical SO33 packet-switched data communication. When the VoIP session is set-up, the programming also causes the station to renegotiate to modify one or more of those parameters, to adapt the radio protocol to the VoIP application. When a VoIP session is complete, the station may renegotiate parameter(s) to return for the standard parameter setting(s), for example, to allow other packet data communications while the station remains on-line. When the PTT call ends, the radio link goes dormant, and radio resources are reassigned. As noted earlier, however, the PPP session may stay up. When the user starts a new data communication, the mobile station starts a new data call through the radio network, in the normal manner. The mobile station requests the call, and the base station assigns resources (if available) to provide the default radio protocol parameters. It should be noted that a PPP session may have plurality of associated "calls," including one or more radio calls (the radio link may go up and down over time as the user begins and ends actual data communications) and a VoIP call or other application layer communication.

Figure 4:
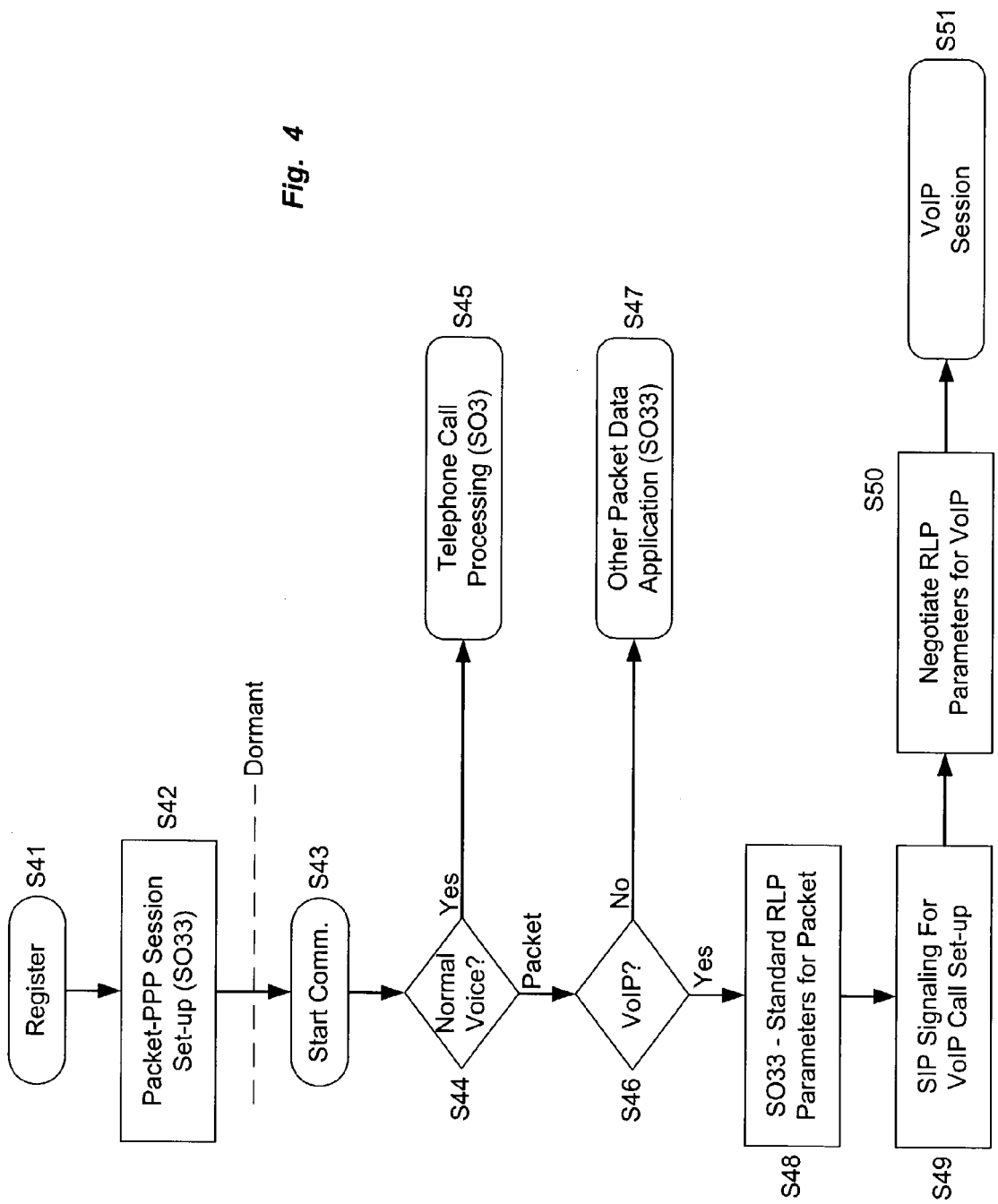
FIG. 4 is a flow chart providing an overview of call set-up logic, showing the negotiation of parameters to correspond to the service application, as might be implemented in the programming of a station such as shown in FIGS. 2 and 3.

FIG. 4 is a high level flow chart useful in explaining the logic implemented in a mobile station, such as one of the exemplary stations 3, 5 or 7. When a mobile station is turned on or first enters a new service area, the mobile station communicates through the base station and switch to register with the radio access network serving that area (step S41). Techniques, systems and protocols for conducting registration and loading necessary profile data are well known in the industry.

If the user wants to make a packet communication or expects an incoming packet communication, the mobile station initiates a packet data session (S42). The station communicates through the base station to the appropriate BSC to establish the radio protocol parameters for a packet communication, typically the standard or default parameters commonly associated with SO33. At the higher protocol layers, the mobile station initiates and the network 1 sets-up a point to point protocol (PPP) type packet link through the PCF to the appropriate PDSN. This will include any validation, etc. necessary with the AAA server 33. The PPP session set-up with the PDSN may also result in an assignment of an IP address to the mobile station. The mobile station may also use this session to register with the PTT Active Directory server 39; and this registration may entail relay of the assigned IP address to the server 39, to allow the PTT Control Switch 37 to subsequently route packets to that mobile station.

For purposes of discussion, it will be assumed that the initial packet communication ends, and the mobile station becomes dormant at some time after the PPP set-up in step S42. The SO33 call through the radio access network (RAN) ends. However, the logical PPP session with PDSN remains active for some period of time, for example, 24 hours. For example, during this period, the mobile station retains the assigned IP address.

Subsequently, there will be a need to start an actual communication (S43). The station and the network 1 support a number of different communication applications, including normal cellular telephone calls, packet data communications and VoIP communications. If the new communication is a normal voice call for example, processing branches at S44 to step S45, at which point, the mobile station makes an outgoing or incoming telephone call, in the normal manner, for example, using an SO3 Service Option.

If the communication is a packet-switched data application, but not VoIP, processing branches at step S46 to step S47, where the station executes the appropriate application and communicates accordingly through the network 1. Since the earlier packet communication via the wireless network ended when the mobile station went dormant, the mobile station and the network will set-up a new SO33 call. Since the PPP session is still logically active, the SO33 radio call and the PPP session enable communication to the PDSN, which provides packet routing through the network 35 and possibly the network 13. Although the mobile station and the radio access network could negotiate other parameters for the radio communications, the communications for the other data application at S47 will typically utilize the default radio protocol parameters commonly associated with SO33 calls, for example with retransmission activated and with a 9.6 kbps fundamental channel. This processing, for example, supports web browsing, e-mail, instant messaging, file transfers, and the like. This processing would utilize the established radio link and typically would not entail any reset or negotiation of modified parameters.

However, if the communication is a VoIP communication, such as for the above discussed PTT service, then processing branches at step S46 to step S48. Again, because the earlier packet communication via the wireless network ended when the mobile station went dormant, the station and the network will set-up a new SO33 call. As in S47, the new radio link will use the standard radio protocol parameters for packet data calls. Again, the PPP session is still logically active, therefore, the SO33 radio call and the PPP session enable communication to the PDSN. The PDSN in turn provides packet routing through the network 35, for example, for communications to or from the PTT control switch server 37.

As noted, when the new SO33 call is set-up in step S48, the mobile station and the network negotiate radio protocol parameters for the radio communications corresponding to the parameters typically used for SO33 packet data call. For example, at this point, the radio protocol parameters include activated RLP retransmission and a 9.6 kbps fundamental channel on the forward link. With this set-up of the radio link, the mobile station conducts the application level signaling, in this case SIP signaling, to set-up the VoIP call (S49). For an outgoing PTT call, for example, the station 3 communicates with the PTT control switch 37 to request a PTT/VoIP session and identify other participant stations 5 and 7. For a called destination station 5 or 7, the station receives an SIP invitation from the control switch 37 to join the PTT session, and communicates acceptance, assuming the user agrees to join in.

When the VoIP set-up signaling involved in step S49 is complete, the mobile station communicates with the network 1 to negotiate a change in one or more of the radio protocol parameters, to specifically support VoIP communications (S50). In the example, the mobile station transmits a Service Request, specifying one or more parameters to be modified, and the base station routes this request message to the switch 21 or 23 providing the BSC function. Assuming that the network can provide the resources to correspond to the modified radio protocol parameter, the BSC responds with a Service Response granting the request and controls the appropriate base station 17 or 19 to operate in accord with the modified set of parameters. If the resources are not available, one or more message exchanges may ensue until the mobile station specifies and obtains a desired set of available radio protocol parameters for the radio link.

Assuming resources are available, a typical negotiation for VoIP at S50 will include an RLP blocking of bits (BLOB) signal, in this case, to deactivate RLP retransmission. The parameter negotiation at S50 also may set a different radio configuration, to provide a higher bit rate fundamental channel (e.g. at 14.4 kbps) for the voice over data-packet communication. At S51, subsequent VoIP session communications to or from the respective mobile station utilize the new radio protocol parameter set, with one or more modified parameters specifically adapted to support VoIP, e.g. without retransmission and/or with the reconfigured fundamental channel providing a higher bit rate. When the VoIP call ends, the radio link goes dormant, and radio resources are reassigned. As noted earlier, however, the PPP session may stay up. When the user starts a new data communication, the mobile station starts a new data call through the radio network, in the normal manner. The mobile station requests the call, and the base station assigns available resources to provide the default radio protocol parameters The flow-chart of FIG. 4 and the corresponding description provides a high-level view of an exemplary logic implemented by the programming of the mobile stations 3, 5 and 7 operating in the network of FIG. 1. To insure a full understanding of the applicability thereof to a specific VoIP service, such as push-to-talk, it may be helpful to consider examples of the incoming and outgoing call processing involved.

Figure 5:
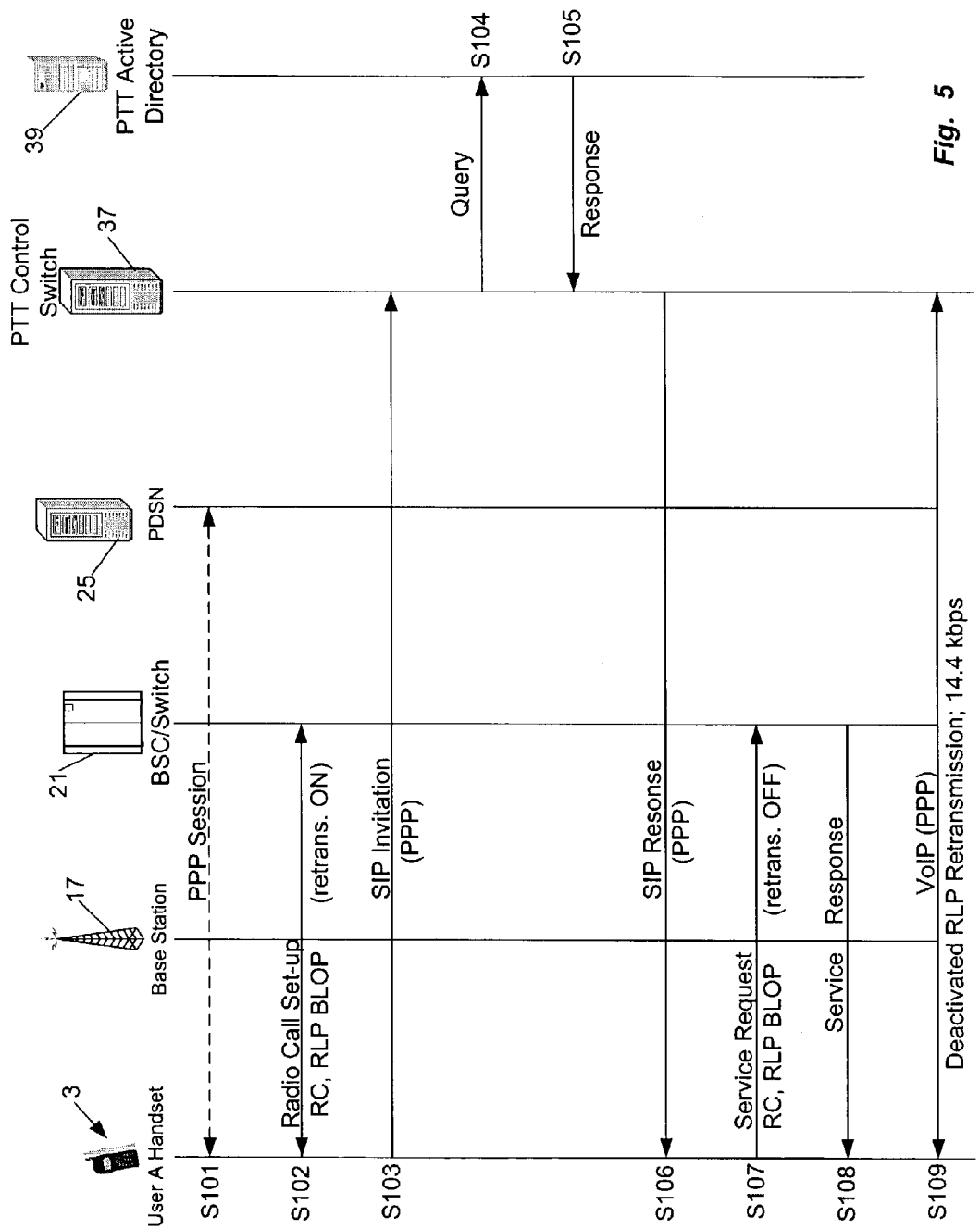
FIG. 5 is a signal flow diagram for call set-up of a push-to-talk session originated (outgoing) from a mobile station.

FIG. 5 is a signal flow diagram for a push-to-talk session originated (outgoing) from a mobile station 3. For discussion purposes, it is assumed that during and earlier packet-switched data call through the radio portion of the network 1, the mobile station 3 obtained a PPP session through the base station 17 and the BSC/Switch 21 to the PDSN 25 (step S101). The higher level signaling to set-up a PPP session should be well known to those skilled in the art. In the examples, this session set-up utilizes the common radio protocol parameters normally associated with the packet data Service Option (SO33) for the radio link, including retransmission and a radio configuration for a 9.6 kbps fundamental channel.

Set-up of the PPP session in step S102 may entail assignment of an IP address to the mobile station 3 by the PDSN 37. The network 1 may provide either Mobile IP (MIP) address assignment or Simple IP address assignment. MIP is a service in which the subscriber is assigned an IP address from a "home" network. With the MIP service, the assigned IP address does not change as the mobile station changes it's point of attachment to the network (e.g. by roaming across a PDSN service boundary). If dynamically assigned, the IP address remains assigned to the particular mobile station until that station logs-off, is inactive for longer than some set period, or the data session is otherwise terminated. MIP provides routing of packets between PDSNs, to effectively enable roaming between service areas of different PDSNs.

Simple IP is a service in which the user is assigned a dynamic IP address from the current serving PDSN. A service provider network provides the user's mobile station with IP routing service. The user's mobile station retains its IP address as long as that station is served by a radio network, which has connectivity to the PDSN that assigned the IP address to the particular mobile station. However, there is no IP address mobility beyond the service area of this PDSN, and as a result, there is no handoff between PDSNs.

Although not shown, the mobile station may have used the earlier radio call and PPP session to register as active with the server 39 and provide the assigned IP address to that server. If or when a data communication ceases for more than a short period of time, the radio call is torn down, so that the network may reassign the radio link resources. Hence, it is assumed that the radio call that included the PPP session set-up has ceased or paused, and the radio communication has gone dormant. However, the PDSN 25 considers the PPP session active for some period of time and allows the mobile station 3 to retain the assigned IP address, for example, for up to 24 hours. In the example of FIG. 5, the actual VoIP type call begins when the User A of handset 3 initiates a PTT session to talk to User B of handset 5 and User C of handset 7. Essentially, the user A makes a selection from a menu and/or dials in numbers for the other handsets to initiate the PTT call.

At this point, a new regular packet-switched data session is set-up through the radio portion of the network 1, as shown at S102. Those skilled in the art will be familiar with the process flow and signaling communications to set-up a packet service link through a 1xRTT radio network. The radio session provides the normal set of radio protocol parameters associated with packet-switched data communications. For example, the radio session set-up at S102 uses a radio protocol parameter set with the RC3 radio configuration, and the signaling includes an RLP layer blocking of bits (BLOB) signal to activate or turn ON the RLP retransmission feature.

Since this is a PTT call, logical set-up now occurs at the higher levels of the protocol stack, and the signaling messages use the previously established PPP session (from S101) and packet data radio link (from S102). The voice over data-packet call set-up therefore utilizes the reliable RF protocol parameters (i.e., with RLP re-transmissions) with base station 17, and the PPP transport to/from the serving PDSN 25.

As shown in FIG. 5, the typical PTT call set-up involves the handset 3 sending one or more SIP signaling messages (at S103), using the PPP session to the PDSN 25; and the PDSN 25 routes the packet(s) for the SIP call set-up signaling as IP packets, through the network 35 to the PTT control switch 37. There may be a number of SIP signaling messages relating to the PTT call set-up exchanged between the mobile station 3 and the PTT control switch 37, though only the initial SIP invitation signaling message transmission (S103) is shown, for convenience.

The PTT control switch 37 accesses the PTT Active Directory server 39 to determine if the other desired participant stations (e.g. 5 and 7) are on-line. For example, the PTT control switch 37 launches a query (at S104) through the network 35 to the PTT Active Directory server 39 requesting status and location information for the destination stations (5 and 7 in the present example). If the directory database in the server 39 indicates that the destinations are both active, the server 39 transmits a response (at S105) back to the PTT control switch 37 via the network 35. The response contains any data needed to contact each destination station (e.g. 5 and 7) at their current locations in the network 1 (or in a visited remote radio access network—not shown). For example, the response may provide the IP addresses currently assigned to the destination stations by the respective radio access networks. The PTT control switch 37 uses the information from the directory server 39 to invite the other stations 5 and 7 to participate in the PTT session, as will be described later, with regard to FIG. 6.

When SIP call set-up is otherwise complete, the PTT control switch 37 signals this status to the mobile station 3. In the example, the PTT control switch 37 sends an SIP response message as an IP packet through the data network 35 (S106). The PDSN 25 routes the packet(s) for the SIP response message over the existing PPP session and the packet data radio link carrying that session, to the mobile station 3.

The mobile station 3 is aware that the application level communication will involve VoIP service, specifically for the PTT application, due to the user activation of the PTT application and attendant initiation of the call to trigger the initial signaling transmission at step S103. Hence, when high-level SIP call set-up signaling is complete, after step S106 in our example, the station 3 is ready to renegotiate one or more of the radio protocol parameters used for further packet communications over the radio link.

To this point in the process, the various packet communications to and from the mobile station 3 over the radio link have used the standard radio protocol parameters for typical packet-switched wireless communications. For example, the SIP call set-up signaling utilized the parameter set with active RLP packet retransmission feature and the 9.6 kbps fundamental channel configuration. This is actually advantageous in that the retransmission insures accurate and complete receipt of the signaling information. Since the amount of data is small (signaling only) the rate is not a significant issue.

The client software 54 in user A's handset 3 initiates renegotiation of radio link parameters, typically to turn retransmission OFF and to change radio configurations (e.g. from 9.6 kbps for normal packet data up to 14.4 kbps for VoIP). For this purpose, the mobile station 3 transmits a Service Request type of signaling message over the air link and through the base station 17 to the BSC 21 (S107). One or more such Service Request messages provide an RLP BLOB signal to turn retransmission OFF and may include a request for a different radio configuration (RC). Assuming that the appropriate radio resources are available and compatible with the requested modification, the BSC responds by sending back an acknowledgement in the form of a Service Response message (S108). The signaling for the radio protocol negotiation could utilize the radio channel(s) set up for packet communication, but typically such communications utilize logically separate signaling channels.

At this stage of the VoIP call processing, the BSC in the switch 21 instructs the base station(s) 17 serving the handset 3 to modify the radio protocol parameters for packet data communications to and from that station 3. In this example, the network 1 changes the parameters to turn OFF the RLP retransmission to reduce latencies and changes the radio configuration to provide a 14.4 kbps fundamental channel to allow use of higher rate vocoding and thus enhance voice quality.

The mobile station 3 of User A starts transmitting and/or receiving voice packets in voice over IP format (S109), for the desired PTT call. From the mobile station 3 to the PDSN 25, these communications utilize the existing PPP session. On the radio link, these communications carry the VoIP packets now over the air link using the modified radio protocol parameters, that is to say without retransmission and with the 14.4 kbps fundamental channel. The PDSN 25 provides the two way routing of such packets, to and from the PTT control switch 37, via the network 35.

FIG. 6 is a signal flow diagram for a push-to-talk or 'PTT' session terminating at (directed or incoming to) a mobile station. Although this process may apply to an incoming call directed to the station 5 of User B, for purposes of discussion, we will consider the incoming PTT call leg directed to the mobile station of handset 7 of User C.

In this example, the VoIP type call begun by User A of handset 3 is now being directed to the mobile station handset 7 of User C. For discussion purposes, it will be assumed here that the station 7 is reachable but not currently engaged in a packet session. Hence, the station 7 has an existing PPP session with the PDSN 29 established during an earlier communication (S201), for example, to register with the PTT Active Directory server 39. The PPP session set-up will typically have caused the PDSN 29 to provide an IP address to the mobile station 7, for example, by MIP or Simple IP assignment; and the registration with the PTT Active Directory server 39 will have provided the assigned IP address to the server 39, to allow other devices to reach the station 7. Although shown as a logical session link, in this example, the station 7 has gone dormant, and the radio portion of the session is inactive. However, the PDSN 29 considers the PPP session active for some period of time and allows the mobile station 7 to retain the assigned IP address, for example, for up to 24 hours.

At this point in the overall call flow, the mobile station 3 has initiated the call and communicated with the PTT control switch 37, and the switch 37 has obtained information for contacting the destination station 7 from the PTT active directory 39. The PTT control switch uses that information to send an SIP invitation for the mobile station 7. The PTT control switch 37 sends the invitation in one or more IP packets addressed to the station 7, through the network 35 to the PDSN 29 (step S202). If there were an existing data call in progress through the radio network with the mobile station 7, the PDSN 29 could pass the invitation packet(s) on to the station 7. However, since there is a PPP session but no active radio link, the PDSN 29 initiates a process to push the data communication out to the mobile station 7.

For that purpose, the PDSN 29 sends a call signal (S203), and in response, the BSC switch 23 causes the base station 19 to page the handset 7 of User C (S204). The page message identifies the type of incoming communication, in this case, a packet-switched data communication, in the normal manner. The mobile handset 7 sends a Page Response message to start the normal signaling process, in this instance, to re-establish the radio link for packet data communication session. This involves an exchange of signaling between the handset 7 and the BSC switch 23 over the air link and through the base station 19 (shown collectively as step S205). Those skilled in the art will be familiar with the process flow and signaling communications to set-up a radio link for a packet-switched data session, through a 1xRTT network. Much like for radio call set-up for the station 3, the re-established session for station 7 at S205 provides the normal set of radio protocol parameters associated with packet-switched data communications. For example, the session set-up at S205 uses a parameter set with the RC3 radio configuration and the signaling includes an RLP blocking of bits (BLOB) signal to activate or turn ON the RLP retransmission feature.

Using the radio link for packet service established at S205 and the existing PPP session, the SIP invitation can be communicated from the PTT control switch 37 through the various network elements to the mobile station 7 (at S206). At least one SIP response message is sent from the mobile station 7 via the PPP session (S207), and the PDSN 29 routes the IP packet(s) for that response through the network 35 to the PTT control switch 37. A number of SIP signal exchanges may occur between the mobile station 7 and the PTT control switch 37, although only the invitation (S206) and response (S207) are shown for convenience.

The SIP signaling to this point uses a packet call with reliable RF link parameters (i.e., with re-transmissions) with base station 17. In the incoming call example, the mobile station 7 is aware that the communication will involve VoIP service, specifically for the PTT application, from the receipt of the SIP invitation message at step S206. Hence, when PTT call set-up is otherwise complete from that station's perspective, after S207 in the simple example, the station 7 is ready to renegotiate one or more of the radio protocol parameters used for further packet communications over the radio link.

The client software 54 in user C's handset 7 initiates renegotiation of radio link parameters, typically to turn retransmission OFF and to change radio configurations (e.g. from 9.6 kbps up to 14.4 kbps for VoIP). For this purpose, the mobile station 7 transmits a Service Request type signaling message, e.g. over a signaling channel of the air link, and through the base station 19 to the BSC 23 (S208). One or more such Service Request messages provide an RLP BLOB signal to turn retransmission OFF and may include a request for a different radio configuration (RC). Assuming that the appropriate radio resources are available and compatible with the requested modification, the BSC responds by sending back an acknowledgement in the form of a Service Response message (S209). The signaling for the radio protocol negotiation could utilize the radio channel(s) set up for packet communication, but typically such communications utilize logically separate signaling channels.

To this point in the process, at least the various high-level SIP communications to and from the mobile station 7 over the radio link have used the radio protocol parameters normally assigned for regular packet-switched data communications, including RLP retransmission and the 9.6 kbps fundamental channel configuration. As in the example of the call from station 3, this is advantageous in that the retransmission insures accurate and complete receipt of the signaling information. However, at this stage of the VoIP call processing, the BSC in the switch 23 instructs the base station(s) 19 serving the handset 7 to modify the radio protocol parameters for packet data communications to and from that station 7. In this example, the network 1 changes the parameters to turn OFF the RLP retransmission to reduce latencies and changes the radio configuration to provide a 14.4 kbps fundamental channel to allow use of higher rate vocoding and thus enhance voice quality.

The mobile station 7 of User C starts transmitting and/or receiving voice packets in voice of IP format, for the desired PTT call (S210). From the mobile station 7 to the PDSN 29, these communications utilize the existing PPP session. On the radio link, these communications carry the VoIP packets now using the modified radio protocol parameters, that is to say without retransmission and with the 14.4 kbps fundamental channel. The PDSN 29 provides the two way routing of such packets, to and from the PTT control switch 37, via the network 35.

A series of steps similar to those in FIG. 6 are performed to establish the incoming VoIP call to the mobile station 5 of User C Handset. With all users on-line and in communication with the PTT control switch 37, the stations and switch provide the PTT communication service, as outlined in the earlier discussion of FIGS. 1-3.

When the PTT communications end, or as each mobile station user leaves the session, the communications via the PTT control switch 37 are torn down. If any of the stations goes off line (for data service), the radio link through the network 1 to the respective PDSN 25 or 29 may also be torn down. However, a mobile station may stay on-line, for example, to allow the user to conduct other packet data communications. In such a case, it may be desirable to maintain the existing PPP session to user's mobile station. When the PTT call ends, the radio link goes dormant, and radio resources are reassigned. As noted earlier, however, the PPP session may stay up. When the user starts a new data communication, the mobile station starts a new data call through the radio network, in the normal manner. The mobile station requests the call, and the base station assigns resources to provide the default radio protocol parameters.

Those skilled in the art will recognize that the concepts outlined above may be implemented in the form of methods performed by the network 1, methods performed by the various mobile stations 3, 5 and 7, or in mobile station equipment. The concepts may also be implemented in software programming, for example, for execution by one of the mobile stations. As such, the concepts herein encompass the programmed components as well as products bearing the relevant software. In alternative examples, hard-wired circuitry may be used in place of or in combination with software instructions to implement the radio parameter setting methods. Thus, examples of the invention are not limited to any specific combination of hardware circuitry and software.

A software product includes at least one machine-readable medium and information carried by the medium. The information carried by the medium may be executable code, for example, for controlling operation of a mobile station in the manner described above for negotiating one ore more radio protocol parameters so as to support a VoIP service application.

The term computer or machine readable "medium" as used herein refers to any medium that participates in providing instructions to a processor or other programmable controller for execution. Such a medium may take many forms, including but not limited to, non-volatile media, volatile media, and transmission media. Non-volatile media include, for example, optical or magnetic storage disks, as might be used to store mobile station programming 54, 56 before loading thereof into the memory 53. Volatile media include dynamic memory, such as random access memory 55, where instructions might reside during actual processing thereof by the microprocessor 51. Transmission media include coaxial cables, copper wire and fiber optics used in the wireline networks 13 and 35 and links of the access network out to the base stations 17, 19, as well as the wireless links between the base stations and the various mobile stations. Transmission media can also take the form of electric or electromagnetic signals, or acoustic or light waves, used to carry information over the transmission links. Both types of transmission media may carry the software, for example, for downloading from a server into memory of a remote mobile station. Hence, common forms of computer-readable media include, for example, a floppy disk, a flexible disk, hard disk, magnetic tape, any other magnetic storage medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, a physical link bearing such a carrier wave or any other medium from which a computer or the like can read instructions and/or data.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A call processing method, for set-up of a voice over data-packet call in a radio access network, comprising:
    establishing a packet communication session through the radio access network for a mobile station, using first radio protocol parameters;
    transporting signaling for the voice over data-packet call to or from the mobile station, through the radio access network, via the established packet communications session using the first radio protocol parameters;
    receiving a request for modification of at least one of the radio protocol parameters, to support the voice over data-packet call, from the mobile station;
    responsive to the request from the mobile station, modifying at least one of the radio protocol parameters to support voice over data-packet call, so as to establish second radio protocol parameters for the packet communication session; and
    transporting voice over data-packet communication packets through the radio access network for the mobile station, via the established packet communication session, using the second radio protocol parameters.

2. The method of claim 1, wherein:
    the first radio protocol parameters include an active packet retransmission feature; and
    the second radio protocol parameters de-activate the packet retransmission feature for the voice over data-packet application.

3. The method of claim 1, wherein:
    the first radio protocol parameters establish a first data rate for a fundamental radio channel; and
    the second radio protocol parameters establish a second data rate for a fundamental radio channel, the second data rate being different from the first data rate.

4. The method of claim 1, wherein:
    the first radio protocol parameters comprise a default set of radio protocol parameters for packet data service applications, including Radio Link Protocol (RLP) retransmission and a first channel configuration providing a first bit rate; and
    the modifying of at least one of the radio protocol parameters comprises deactivating retransmission and setting a second channel configuration providing a second bit rate, the second bit rate being different from the first bit rate.

5. The method of claim 1, wherein the transported signaling for the voice over data-packet call is initiated by the mobile station and relates to an outgoing voice over data-packet call from the mobile station.

6. The method of claim 1, wherein the transported signaling for the voice over data-packet call includes a message sent to the mobile station signifying an incoming voice over data-packet call directed to the mobile station.

7. The method of claim 1, wherein the transported signaling for the voice over data-packet call relates to set-up of a push-to-talk (PTT) session with at least one remote user's communication terminal.

8. The method of claim 1, wherein the voice over data-packet call utilizes Voice over Internet Protocol (VoIP).

9. A method of making a voice over data-packet call from a mobile station through a radio access network, comprising:

establishing a packet communication session through the radio access network for the mobile station, using first radio protocol parameters;

determining in the mobile station that the session will carry communications relating to the voice over data-packet call;

sending or receiving signaling for the voice over data-packet call at the mobile station, through the radio access network, via the established packet communication session using the first radio protocol parameters;

transmitting a request for modification of at least one of the radio protocol parameters to support the voice over data-packet call, to the radio access network, so as to establish second radio protocol parameters for the packet communication session; and transmitting or receiving voice over data-packet communication packets through the radio access network at the mobile station, via the established packet communication session, using the second radio protocol parameters.

10. The method of claim 9, wherein:
the first radio protocol parameters include an active packet retransmission feature; and
the request for modification signifies a request to deactivate the packet retransmission feature.

11. The method of claim 9, wherein:
the first radio link protocol parameters establish a configuration of a fundamental radio channel providing a first data rate; and
the request for modification signifies a request to reconfigure the fundamental radio channel to provide a second data rate different from the first data rate.

12. The method of claim 9, wherein the request for modification signifies a request for deactivation of a packet retransmission feature and a request to change a radio configuration to provide a higher rate fundamental channel for the established session.

13. The method of claim 9, wherein the mobile station determines that the session will carry communications relating to the voice over data-packet call in response to a user input indicative of an intent to make an outgoing voice over data-packet call from the mobile station.

14. The method of claim 9, wherein the mobile station determines that the session will carry communications relating to the voice over data-packet call in response to a signaling message received from the radio access network indicating an incoming voice over data-packet call is directed to the mobile station.

15. The method of claim 9, wherein the signaling for the voice over data-packet call relates to set-up of a push-to-talk (PTT) session with a remoter user's communication terminal.

16. The method of claim 9, wherein the voice over data-packet call utilizes Voice over Internet Protocol (VoIP).

17. A mobile station for use in a radio access network, comprising:
an audio input, and an audio output;
a vocoder for digitizing and compressing outgoing audio signals from the audio input and for converting incoming digitized compressed audio information to signals for the audio output;
a wireless transceiver for two-way communication via the radio access network;
a programmable controller coupled to the vocoder and the wireless transceiver for controlling operation thereof;
a user interface coupled to the programmable controller to enable a user of the terminal device to receive data and provide input to the programmable controller; and
a memory coupled to the controller storing a program for execution by the controller, wherein execution of the program by the controller causes the mobile station to perform a sequence of steps, comprising:

(a) establishing a packet communication session through the radio access network for the mobile station, using first radio protocol parameters;

(b) determining that the session will carry communications relating to a voice over data-packet call;

(c) sending or receiving signaling for the voice over data-packet call at the mobile station, though the radio access network, via the established packet communications session using the first radio protocol parameters;

(d) transmitting a request for modification of at least one of the radio protocol parameters to support the voice over data-packet call, to the radio access network, so as to establish second radio protocol parameters for the packet communication session; and (e) transmitting or receiving voice over data-packet communication packets through the radio access network at the mobile station, via the established packet communication session, using the second radio protocol parameters.

18. The mobile station of claim 17, wherein the request for modification signifies at least one of: a request for deactivation of a packet retransmission feature and a request to change a radio configuration to provide a different rate fundamental channel for the established session.

19. The mobile station of claim 17, wherein the mobile station determines that the session will carry communications relating to the voice over data-packet call in response to a user input indicative of an intent to make an outgoing call.

20. The mobile station of claim 17, wherein the mobile station determines that the session will carry communications relating to the voice over data-packet call in response to a signaling message received from the radio access network indicating an incoming voice over data-packet call is directed to the mobile station.

21. The mobile station as in claim 17, wherein the transmitting or receiving of voice over data-packet communication packets comprises sending or receiving Voice over Internet Protocol (VoIP) packets via the established packet communication session, using the second radio protocol parameters.

22. The mobile station as in claim 21, wherein the program comprises a session initiation protocol (SIP) client program.

23. The mobile station as in claim 22, wherein the SIP client program supports a push-to-talk (PTT) service application.

24. A software product, comprising:
at least one machine readable medium;
programming code, carried by the at least one machine readable medium, for execution by a controller of a mobile station, wherein execution of the programming code by the controller causes the mobile station to perform a sequence of steps, comprising:
establishing a packet communication session through a radio access network for the mobile station, using first radio protocol parameters;
determining that the session will carry communications relating to a voice over data-packet call;

sending or receiving signaling for the voice over data-packet call at the mobile station, through the radio access network, via the established packet communications session using the first radio protocol parameters;

transmitting a request for modification of at least one of the radio protocol parameters to support the voice over data-packet call, to the radio access network, so as to establish second radio protocol parameters for the packet communication session; and transmitting or receiving voice over data-packet communication packets through the radio access network at the mobile station, via the established packet communication session, using the second radio protocol parameters.

25. The mobile station of claim 24, wherein the request for modification signifies at least one of: a request for deactivation of a packet retransmission feature and a request to change a radio configuration to provide a different rate fundamental channel for the established session.

26. The software product of claim 24, wherein the programming code enables the mobile station to determine that the session will carry communications relating to the voice over data-packet call in response to each of a user input indicative of an outgoing voice over data-packet call and receipt of a signaling message at the mobile station indicative of an incoming voice over data-packet call.

27. The software product of claim 24, wherein the transmitting or receiving of voice over data-packet communication packets comprises sending or receiving Voice over Internet Protocol (VoIP) packets via the established packet communication session, using the second radio protocol parameters.

28. The software product of claim 27, wherein the programming code comprises a session initiation protocol (SIP) client program.

29. The software product of claim 28, wherein the SIP client program supports a push-to-talk (PTT) service application.

30. A system comprising:

a radio access network for providing packet data communications for one of a plurality of mobile stations using a set of radio protocol parameters defining operational characteristics on a radio link for communication with the one mobile station; and means for detecting an intent to conduct a voice over data-packet communication for the one mobile station and in response negotiating a modification of at least one of the radio protocol parameters for providing packet data communications over the radio link so as to support the voice over data-packet communication for the one mobile station.

31. A system as in claim 30, wherein said means detects initiation of an outgoing Voice over Internet Protocol (VoIP) communication from the one mobile station.

32. A system as in claim 30, wherein said means detects a Voice over Internet Protocol (VoIP) communication incoming to the one mobile station.

* * * * *